United States Patent [19]

Jovanovic

[11] Patent Number: 4,655,192
[45] Date of Patent: Apr. 7, 1987

[54] COOKING APPARATUS USING STEAM INJECTION AT ATMOSPHERIC PRESSURE

[76] Inventor: Dragomir Jovanovic, 6, Impasse J. Moulin, 38800 Pont de Claix, France

[21] Appl. No.: 734,938

[22] Filed: May 16, 1985

[30] Foreign Application Priority Data

May 17, 1984 [FR] France ............................... 84 07985

[51] Int. Cl.[4] ............................................. A21B 1/08
[52] U.S. Cl. ................................... 126/20; 126/20.2; 126/369; 126/369.1; 126/369.3; 219/401; 99/467
[58] Field of Search ........................ 126/20, 20.1, 20.2, 126/369, 369.1, 369.2, 369.3, 348; 219/400, 401; 165/DIG. 25; 426/510, 511; 99/468, 339, 467

[56] References Cited

U.S. PATENT DOCUMENTS

| | | | |
|---|---|---|---|
| 352,230 | 11/1886 | Danner | 126/369.3 |
| 512,339 | 1/1894 | Tallant | 126/369.2 |
| 550,516 | 11/1895 | Leigh | 126/369.2 |
| 934,858 | 9/1909 | Trescott | 126/369 |
| 1,865,973 | 7/1932 | Shields | 126/369 |
| 2,750,937 | 6/1956 | Sjölund | 126/369.2 |
| 2,885,294 | 5/1959 | Larson et al. | 126/369 X |
| 4,173,215 | 11/1979 | Bureau et al. | 126/369 |
| 4,426,923 | 1/1984 | Ohata | 126/369 X |
| 4,506,598 | 3/1985 | Meister | 126/369.1 |

FOREIGN PATENT DOCUMENTS

| | | | |
|---|---|---|---|
| 434055 | 1/1912 | France . | |
| 899497 | 5/1945 | France . | |
| 1036744 | 9/1953 | France | 126/369 |
| 2396927 | 2/1979 | France . | |
| 474594 | 9/1952 | Italy | 126/369.2 |
| 1092283 | 11/1967 | United Kingdom . | |

Primary Examiner—Margaret A. Focarino
Attorney, Agent, or Firm—Karl F. Ross; Herbert Dubno

[57] ABSTRACT

Nonpressurized steam cooking is effected utilizing an instantaneous steam generator which intermittently feeds steam to a container for the foodstuff in an enclosure. The space between the enclosure and the container is heated by heating means independently of the steam boiler so that the walls of the container are at a temperature above 100° C. so that steam condenses substantially exclusively on the food rather than on the container walls and steam wastage is minimized.

5 Claims, 5 Drawing Figures

COOKING APPARATUS USING STEAM INJECTION AT ATMOSPHERIC PRESSURE

BACKGROUND OF THE INVENTION

In the domestic arts, when foods are to be cooked with steam, use is often made of a pressure cooker consisting of a pot and a cover affixed to the pot by air-tight closing means comprising, in addition, a tightening device so that it can resist pressure.

Cooking with pressurized steam in a closed container leads to numerous stresses. Thus, it is impossible to control the cooking of foods without going through decompression and opening of the container and therefore without increasing the cooking time. Furthermore, this cooking method requires constant attention during cooking and upon decompression. Finally, the fact that it is necessary to use a pressure resistant container leads to a heavy, expensive, bulky apparatus which is difficult to store and whose cleaning is tedious.

A food heating apparatus is also known through British patent No. 1 092 283 which comprises a container closed with a cover which can be connected to a source of steam. In order for the food placed in the container to be cooked slowly, these devices require a large quantity of steam whose energy is, for the most part, unused and which escapes to the outside or condenses on the walls of the container.

French patent application No. 2 396 927 relates to an apparatus comprising a boiler discharging steam into a cooking enclosure. The steam, mixed with air heated to 95° C., condenses onto the foods but also onto the walls of the enclosure so that a substantial part of its heat is lost and the energy efficiency is high.

The objects of the invention is to provide a steam injection cooking apparatus operating at atmospheric pressure using closed containers with covers that are set down and which can be connected to a steam source, which uses a small amount of energy and do not have the drawbacks of pressure cookers and provides a cooking method which is clean, convenient and danger free, thus making it possible for an operator not only to control cooking in a regular manner but also to associate a different cooking method with pressure cooking.

SUMMARY OF THE INVENTION

This apparatus comprises a cooking enclosure, closed with an access door which can hold the container which can be connected to a steam source, means for the production of steam in an intermittent and instantaneous operation, autoregulated and controlled by a timing mechanism, discharging by at least one steam injection nozzle located within the cooking enclosure and which can be connected to the container and means for heating this enclosure capable of imparting to it, during the steam cooking operation, a temperature of at least 100° C. in order to raise the container to a temperature which will prevent the condensation of steam on it and in order to insulate this container from the external air by means of the surrounding hot air.

In order to cook foods with this apparatus, the container holding the foods is simply engaged into the cooking enclosure which is then connected to the stem distribution nozzle after which the enclosure heating means and the instantaneous steam production means are set into operation.

The heating means raise the enclosure and the container to a temperature of the order of 100° C. Thus, the steam produced is brought, without any noteworthy heat loss, into a container which, at a temperature of at least 100° C., is insulated from the outside by the surrounding air of the enclosure. This steam does not condense onto the container but onto the food. It thus liberates the penetrating heat thereof onto the food and cooks it progressively. The steam, which is on standby in the surrounding space of the container and which has not yet contacted the food, remains ready to do so and does not condense onto the wall of the container for only the food can induce this condensation as long as it is at a temperature below 100° C.

This apparatus therefore makes it possible to cook foods with steam at 100° C. and therefore practically at atmospheric pressure thanks to the thermal protection provided by the cooking enclosure raised to at least 100° C.

The use of steam at atmospheric pressure makes it possible to use containers made of transparent materials and therefore to ensure a permanent control of the cooking operation. This control can also be carried out by gaining access into the container without the necessity of decomposing it as is the case in pressure cookers and without affecting the cooking time to any substantial extent.

Finally, the association of steam injection cooking means with the enclosure heating means makes it possible to use the latter means to obtain browning or other effects and to thus widen the field of cooking applications.

BRIEF DESCRIPTION OF THE DRAWING

Other characteristics and advantages will become apparent from the following description, reference being made to the appended schematic drawing showing by way of non limiting examples, several embodiments of this cooking apparatus.

SPECIFIC DESCRIPTION

The apparatus according to the invention comprises, whatever the embodiment thereof may be, a cooking enclosure A, an instantaneous steam production means B and at least one container C which can extend into the cooking enclosure A.

Figure 1:
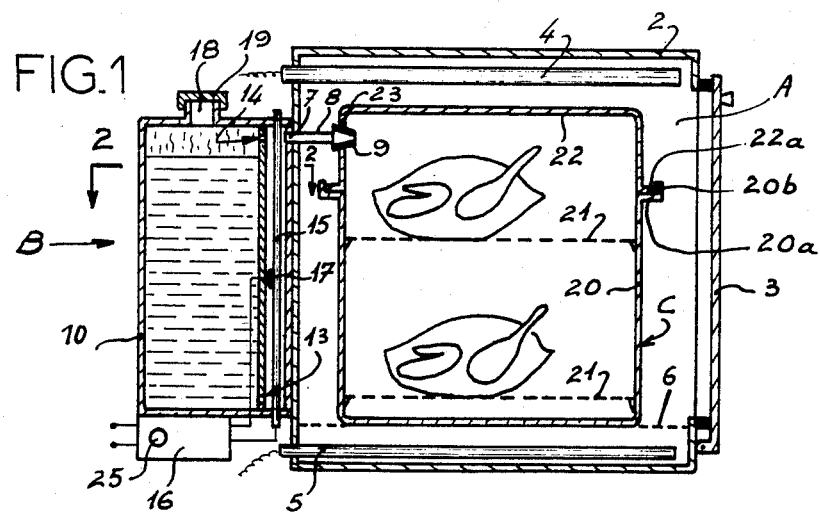
FIG. 1 is a longitudinal section, seen from the side, of a first embodiment of this apparatus.

In the embodiment shown in FIG. 1, the cooking enclosure A consists of an electric oven 2, provided with an access door 3, electric heating means consisting of resistances respectively in the dome 4 and in the base 5, and possibly with peripheral insulation means, not shown. This oven also comprises, in a known manner, a grid 6 capable of supporting a container.

The instantaneous steam production means B is coupled to the oven. The steam discharge port 7 is connected, by means of flexible tubing 8, to a steam injection nozzle 9.

Figure 2:
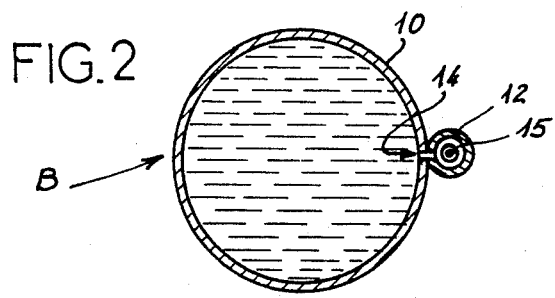
FIG. 2 is a sectional view taken along line 2-2 of FIG. 1 showing, on an enlarged scale, an embodiment of the instantaneous steam production means.

In one embodiment of the invention, shown in detail in FIG. 2, the steam production means B consists of an instantaneous production boiler comprising a first vertical cylindrical container 10, acting as a water tank and of a second vertical cylindrical container 12. This container 12, attached to the first one, communicates with the latter through a water transit lower channel 13 and through a water equilibration upper bore 14. An electric heating resistance 15, the operating control means 16 of which are associated with a thermostatic detector 17, extends through container 12. The internal diameter of the container 12 which is much smaller than that of container 10 acting as a tank, is determined as a function of the external diameter of resistance 15 and so that the annular space formed around this resistance has a small thickness so that the water contained in that housing can evaporate quickly. The cylindrical container 10 has on its upper part, a filling port 18 provided with a sealing plug 19.

It should be noted that the water filling level of both containers 10 and 12 is set so as to remain below the steam discharge port 7.

As soon as the control 16 of the boiler actuates the supply of power to the resistance 15, the latter emits calories which give rise to the conversion of water to steam. This steam escapes through port 7 and arrives at the injection nozzle 9 through tubing 8. When the resistance reaches an excessive temperature which might damage it, detector 17 acts on the control means 16 to interrupt the power supply to the resistance is. Inversely, as soon as the temperature of the resistance has gone down sufficiently, the same means 17 actuates the power supply to the resistance. This arrangement makes it possible to obtain instantaneous steam without risking deterioration of the resistance.

The container C, designed to receive the foods, consists of a receptacle 20 and a cover 22. This cover is placed on the receptacle 20 and is in air-tight contact with it by virtue of its own weight. In the embodiment shown, a flange 22a of the cover 22 rests on a flange 20a with a peripheral ridge 20b surrounding the opening of the receptacle 20. This arrangement favors the proper positioning of the cover with respect to the receptacle and makes it possible to obtain a sufficient relative air-tightness between the two components of the container. The cover 22 is provided with an opening 23 capable of receiving the steam injection nozzle 9. As shown in FIG. 1, the container C can comprise internal separation grids 21 which make it possible to support various foods.

This cooking aparatus is completed by a temperature adjustment member provided by the resistances heaters 4 and 5 of the cooking enclosure A and by a timing mechanism 25 which determines the operating time of the boiler B.

When the container C is introduced into the oven and placed on the grid 6, the injection nozzle 9 is introduced into the opening 23 of the cover after which the oven door is closed. Finally, while the heating means 4 and 5 are set into operation, the timing mechanism 25 associated with the boiler B is actuated.

While in operation, the boiler sends discontinuous streams of steam into the container C. These streams of steam which condense onto the food provide for its progressive cooking. When the food has been raised to a sufficient temperature and the steam no longer condenses on it, the excess steam can escape from the container by passing between the flanges 20a–22a in bearing contact.

Because of the vertical arrangement of the boiler, as steam is being consumed, the water level falls in the tank 10 and in the container 12. As a result, the quantity of steam emitted in each stream of steam progressively decreases throughout the cooking operation in proportion to the needs thereof and this steam production is self-regulated by the very construction of the boiler without any other means.

If the container is not made out of glass, cooking control is effected simply by raising the cover 22 after the door 3 has been opened. This operation is without any danger whatsoever since there is no pressure in the container and does not have any effect on cooking time.

This apparatus makes it possible to obtain very good cooking results through the use of reduced quantities of steam with a high efficiency. Thus, when using a boiler with an electric power of 750 watts and an oven having an electric power of 650 watts, approximately 20 minutes are sufficient to cook 2.5 kilograms of potatoes. Under these conditions, the power consumed is equal to 310 watts distributed in the proportion of 250 watts for the boiler and 60 watts for the oven. It should be noted that, under these conditions, approximately 500 grams of steam were produced and condensed to effect the cooking by using a 750 watt boiler.

It should be noted that during the steam cooking phase, the heating means need only raise the temperature of the enclosure A to 100° C., but it is self-evident that these heating components can be more powerful in order to ensure mixed cooking. In such a case, after steam cooking, the cover 22 is removed in order to allow, for example gratinating by means of resistance heater 4 or an infrared heater complementary to that resistance.

This apparatus is primarily intended for domestic cooking where it advantageously extends the range of possibilities of oven cooking in comparison with those of pressure cooking without the disadvantages of the latter. The user of such an oven therefore saves the purchase cost of a pressure cooker which considerably reduces his investment while allowing him to perform both types of cooking operations.

Figure 3:
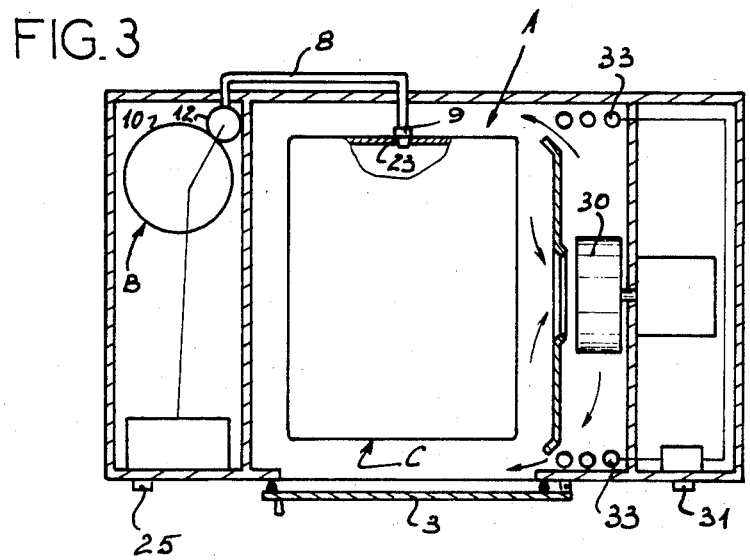
FIG. 3 is a sectional top view showing another embodiment of the apparatus.

The embodiment shown in FIG. 3 differs from the preceding one by the fact that the oven 2 is provided with pulsed air or forced convection heating means. More specifically, a motor driven blower 30 causes the permanent circulation of the surrounding air through electrical resistances 33 and within the enclosure. Except for this difference, this apparatus is in all respects similar to the one represented by the preceding embodiment and is coupled, like the latter, to an instantaneous steam production boiler B. Upon operation of this apparatus, the enclosure heating means are set by the thermostat 31 so that said enclosure is raised to a temperature of at least 100° C. so as to ensure the insulation of the container C during the steam cooking phase.

Figure 4:
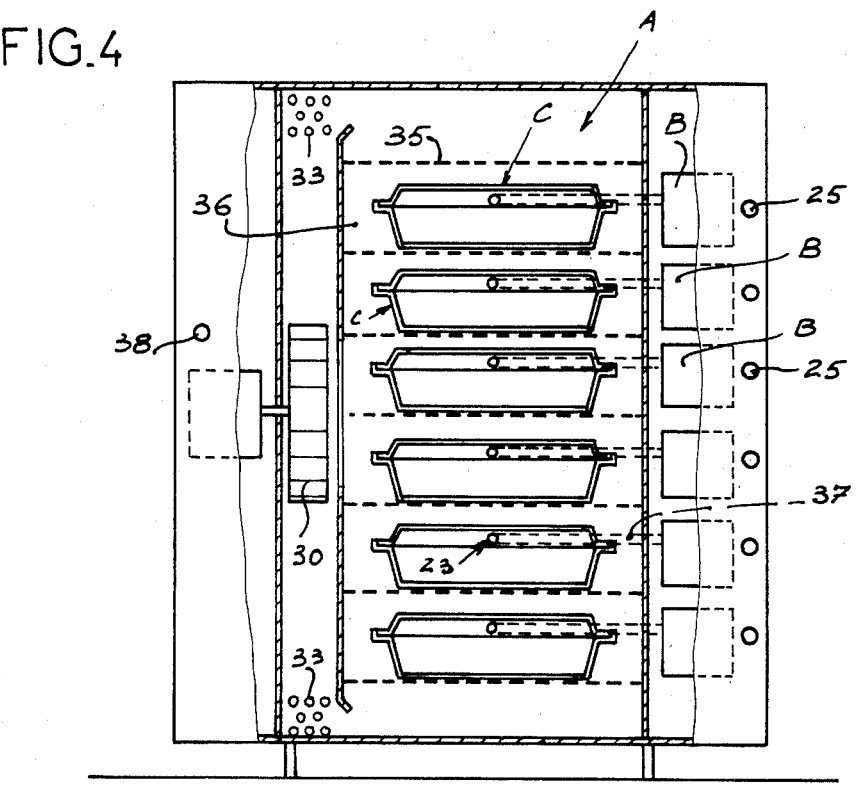
FIG. 4 is an elevational front view with a partial section showing the application of the apparatus to collective cooking.
Figure 5:
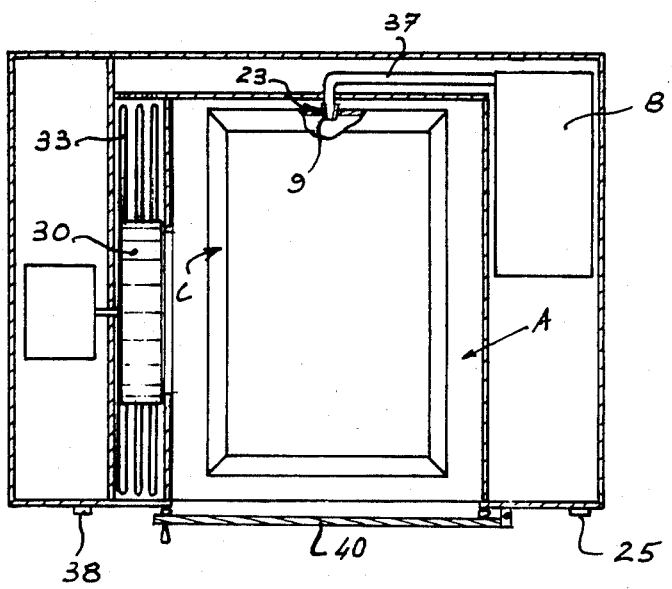
FIG. 5 is a cross-sectional view of the apparatus shown in FIG. 4.

The embodiment shown in FIGS. 4 and 5 is an apparatus for collective cooking. The cooking enclosure A is divided, by means which are each capable of supporting a container, such as grid 35, into several compartments 36 which can each receive a container C. Each compartment 36 is associated with an instantaneous steam production boiler B communicating through piping 37 with a steam injection nozzle 9. This nozzle projects from the bottom of the compartment and is provided with click and ratchet means, of a known type, which can cooperate with complementary means placed side by side with the rear opening 23 with which container C is provided. Each boiler is associated with an individual timing mechanism 25 which determine its operating time.

The cooking enclosure heating means is, in the embodiment shown, of the pulsed air or forced convection type and comprise a motor turbine 30 and electrical resistances 33. The temperature of the electrical resistances is determined by an adjustable thermostat 38. This cabinet, in a known manner, comprises at least one front door 40 and, preferably, as many doors 40 as compartments 36.

It can be seen easily that, because of this arrangement, all the containers C maintained in the cooking enclosure A are raised to the same temperature of the order of 100° C. by the heating means of this enclosure but that they can also be subjected to steam cooking schedules of different duration simply by adjusting the timing mechanisms 25 associated with their individual boilers.

In the latter case, the removal of one of the containers does not disturb the operation of the enclosure and allows the continuation of cooking in the other containers.

This application of the invention to collective cooking is particularly valuable for, through the use of an apparatus which is less expensive than a pressure cooker, it is possible to combine steam cooking with hot air and radiation cooking.

I claim:

1. A cooking apparatus for cooking a foodstuff under atmospheric pressure, comprising:
   a nonpressurized cooking enclosure provided with at least one access door and with holding means for supporting at least one cooking container in said enclosure in spaced relationship with respect to walls thereof;
   a closable but nonpressurized cooking container adapted to receive said foodstuff supported on said holding means in said enclosure in said spaced relationship with respect to walls thereof;
   an intermittently operable boiler affixed to said enclosure and having a heater in contact with a thin layer of water for instantaneous generation of steam upon energization of said heater;
   means including at least one steam injection nozzle opening into said container for connecting said container in said enclosure with said boiler for intermittently introducing steam into said container to cook the foodstuff therein; and
   heating means, independent of said heater associated with said boiler, within said enclosure externally of said container and space therefrom for heating air in a space between said walls and said container to a temperature of at least 100° C. wherein the temperature of said walls and said container is raised a level precluding condensation of steam on said walls and said container, condensation occurring onto said food stuff as long as it is at a temperature below 100° C.

2. The apparatus defined in claim 1 wherein said intermittently operable boiler comprises a vertical cylindrical water tank having a filling port, a vertical cylindrical compartment attached to said tank and adjacent same, said heater extending centrally through said compartment, said compartment closely surrounding said heater, said compartment communicating at its bottom through a water-transit passage with a bottom portion of said tank, said means including said steam-injection nozzle being formed as a steam outlet at an upper end of said compartment and a tube connecting said outlet to said nozzle, an equilibration port communicating between said tank and said compartment above a water level therein.

3. The apparatus defined in claim 2 wherein said heater is provided with a thermostat and control means responsive to said thermostat for electrical energization of said heater.

4. The apparatus defined in claim 1 wherein said enclosure is subdivided into a plurality of compartments by respective holding means each adapted to receive a respective cooking container, said enclosure having a plurality of access doors, each allowing access to at least one of said containers, a respective boiler being provided for each container and each of said boilers having a timing mechanism individual thereto.

5. The apparatus defined in claim 1 wherein said cooking container comprises a receptacle having an outwardly extending flange with an upwardly turned outer rim surrounding a mouth of said receptacle and a cover formed with an outer flange resting on said flange of said receptacle solely by its weight and in air-tight contact with said receptacle inwardly of said rim.

* * * * *